(12) United States Patent
Frigerio et al.

(10) Patent No.: US 9,279,935 B2
(45) Date of Patent: Mar. 8, 2016

(54) LOW MACROBENDING LOSS SINGLE-MODE OPTICAL FIBRE

(75) Inventors: Silvio Frigerio, Milan (IT); Ricardo Antunes De Camargo, Milan (IT); Lidia Terruzzi, Milan (IT)

(73) Assignee: PRYSMIAN S.P.A., Milan (IT)

( * ) Notice: Subject to any disclaimer, the term of this patent is extended or adjusted under 35 U.S.C. 154(b) by 232 days.

(21) Appl. No.: 13/995,310

(22) PCT Filed: Dec. 23, 2010

(86) PCT No.: PCT/EP2010/070650
§ 371 (c)(1),
(2), (4) Date: Jun. 18, 2013

(87) PCT Pub. No.: WO2012/084050
PCT Pub. Date: Jun. 28, 2012

(65) Prior Publication Data
US 2013/0272670 A1   Oct. 17, 2013

(51) Int. Cl.
*C03B 37/012* (2006.01)
*C03B 37/014* (2006.01)
(Continued)

(52) U.S. Cl.
CPC .......... *G02B 6/036* (2013.01); *C03B 37/01211* (2013.01); *C03B 37/01248* (2013.01);
(Continued)

(58) Field of Classification Search
CPC .................................................. G02B 6/03666
See application file for complete search history.

(56) References Cited

U.S. PATENT DOCUMENTS 4,820,322 A   4/1989   Baumgart et al.
4,846,867 A   7/1989   Yokota et al.
(Continued)

FOREIGN PATENT DOCUMENTS

CN   1768282   5/2006
EP   0 972 752 A1   1/2000
(Continued)

OTHER PUBLICATIONS

International Search Report from the European Patent Office for International Application No. PCT/EP2010/070650, mailed Sep. 20, 2011.
(Continued)

*Primary Examiner* — Michelle R Connelly
*Assistant Examiner* — John M Bedtelyon
(74) *Attorney, Agent, or Firm* — Finnegan, Henderson, Farabow, Garrett & Dunner, L.L.P.

(57) ABSTRACT

A single-mode transmission optical fiber includes a central core region radially outwardly from a centerline to a radius $r_1$ and having a positive relative refractive index $\Delta_1$; a first inner cladding region extending radially outwardly from the central core to a radius $r_2$ and having a negative relative refractive index $\Delta_2$; a second inner cladding region extending radially outwardly from the first inner cladding region to a radius $r_3$ and having a non-negative relative refractive index $\Delta_3$; an intermediate cladding region extending radially outwardly from the second inner cladding region to a radius $r_4$ having a negative relative refractive index $\Delta_4$ larger in absolute value than the relative refractive index $\Delta_2$; and an outer cladding region extending radially outwardly from the intermediate cladding region and having a non-negative relative refractive index $\Delta_5$; wherein the relative refractive index $\Delta_2$ of the first inner cladding region is $-0.1 \cdot 10^{-3}$ to $-1.0 \cdot 10^{-3}$ and the relative refractive index $\Delta_4$ of the intermediate cladding is $-3.0 \cdot 10^{-3}$ to $-5.0 \cdot 10^{-3}$.

9 Claims, 3 Drawing Sheets

(51) Int. Cl.
*C03B 37/018* (2006.01)
*G02B 6/036* (2006.01)

(52) U.S. Cl.
CPC ..... *C03B37/01257* (2013.01); *C03B 37/01446* (2013.01); *C03B 37/01807* (2013.01); *G02B 6/03666* (2013.01); *C03B 2201/02* (2013.01); *C03B 2201/12* (2013.01); *C03B 2201/31* (2013.01); *C03B 2203/24* (2013.01)

(56) References Cited

U.S. PATENT DOCUMENTS

| | | | |
|---|---|---|---|
| 6,091,873 A | 7/2000 | Matsuo et al. | |
| 6,105,396 A | 8/2000 | Glodis et al. | |
| 6,130,974 A * | 10/2000 | Rivoallan | 385/37 |
| 6,422,042 B1 | 7/2002 | Berkey | |
| 6,584,808 B1 | 7/2003 | Roba et al. | |
| 6,647,191 B2 * | 11/2003 | Li | 385/127 |
| 6,931,186 B2 | 8/2005 | Sillard et al. | 385/123 |
| 7,164,835 B2 | 1/2007 | Matsuo et al. | |
| 7,203,407 B2 * | 4/2007 | Berkey et al. | 385/123 |
| 7,283,714 B1 * | 10/2007 | Gapontsev et al. | 385/126 |
| 7,603,014 B2 * | 10/2009 | Rathje et al. | 385/127 |
| 8,301,000 B2 * | 10/2012 | Sillard et al. | 385/126 |
| 2003/0145630 A1 | 8/2003 | Hirano et al. | |
| 2004/0139765 A1 | 7/2004 | Hirano et al. | |
| 2006/0039665 A1 | 2/2006 | Matsuo et al. | |
| 2008/0260339 A1 | 10/2008 | Barish et al. | |
| 2010/0189400 A1 * | 7/2010 | Sillard et al. | 385/127 |

FOREIGN PATENT DOCUMENTS

| | | |
|---|---|---|
| EP | 1 440 947 A1 | 7/2004 |
| EP | 1 785 754 | 5/2007 |
| EP | 1 788 411 | 5/2007 |
| EP | 1 845 399 | 10/2007 |
| EP | 2 211 211 | 7/2010 |
| FR | 2 766 584 | 1/1999 |
| JP | 11-119045 | 4/1999 |
| WO | WO 2012/084049 A1 | 6/2012 |

OTHER PUBLICATIONS

ITU-T, G.657, "Characteristics of a Bending-Loss Insensitive Single-Mode Optical Fibre and Cable for the Access Network," Recommendation ITU-T G.657, pp. i-iv and 1-13. (2009).

ITU-T, G. 652, "Characteristics of a Single-Mode Optical Fibre and Cable," ITU-T Recommendation G.652, pp. i-iii and 1-13, (2003).

Written Opinion of the International Searching Authority for International Application No. PCT/EP2010/070650, mailed Sep. 20, 2011.

* cited by examiner

LOW MACROBENDING LOSS SINGLE-MODE OPTICAL FIBRE

CROSS REFERENCE TO RELATED APPLICATION

This application is a national phase application based on PCT/EP2010/070650, filed Dec. 23, 2010, the content of which is incorporated herein by reference.

FIELD OF THE INVENTION

The present invention relates to a single-mode optical fibre for telecommunication, in particular to a low macrobending loss single-mode optical fibre.

BACKGROUND OF THE INVENTION

The use of single-mode optical fibres in fibre-to-the-premises (FTTP) applications, including fibre-to-the-home (FTTH) and fibre-to-the-building (FTTB) applications, generally require low bending loss of optical signals transmitted through the fibres, also under stringent installation constraints that may impose tight bend radii, e.g., due to sharp cornering in buildings or compression of optical fibres. In particular, cabling and hardware applications aimed to miniaturize passive field equipment, e.g. local convergence cabinets or storage boxes, and the development of multi-dwelling units (MDUs) require fibre designs with superior bending capabilities. In addition, coarse wavelength division multiplexing systems (CWDM) and passive optical network (PON) systems may also need employment of bend-resistant optical fibres.

In order to standardize the bending performance of optical fibres particularly suited for FTTP applications, the ITU-T (International Telecommunications Union, ITU Telecommunication Sector) has developed recommendations G.657 that defines single-mode fibres with enhanced bending performance.

To conform to international standards, besides bending capabilities, fibre performance is evaluated also on other relevant optical parameters such as the cable cut-off wavelength and the mode field diameter (MFD). Recommended values for the MFD and for the cable cut-off wavelength are given in the ITU-T G.652 standard. A parameter that can be useful for finding a compromise between the MFD, the cut-off wavelength and bending losses is the so-called MAC number, which is the ratio of the MFD and the cut-off wavelength.

Optical fibres having an inner cladding region with depressed refractive index have been tailored to provide single-mode transmission and robust bend-resistance. The index depression of the inner cladding region is achieved, for example, by doping with fluorine a region surrounding the core region of the preform for production of the optical fibre.

EP 1785754 discloses an optical transmission fibre adhering to the G.652 standard for applications in FTTH or FTTC (fibre to the curb). The described fibre comprises a central core having an index difference $\Delta n_1$ with an outer optical cladding; a first inner cladding having an index difference $\Delta n_2$ with the outer cladding; a second, buried, inner cladding having an index difference $\Delta n_3$ with the outer cladding of less than $-3 \cdot 10^{-3}$, and containing germanium in a weight concentration of between 0.5% and 7%. The preform of the fibre is produced by PCVD (Plasma Chemical Vapour Deposition), which is said to allow a high number of highly reactive fluorine ions and thus to add germanium to the reaction and nonetheless to obtain a buried inner cladding.

EP 1845399 relates to an optical transmission fibre having a refractive index profile with a first highly depressed section and a weakly depressed second section. The document states that with such a structure it is possible to effectively reduce the bending losses at constant MAC while strongly minimising the leakage modes of a higher order.

In U.S. Pat. No. 7,164,835, an optical fibre that exhibits a low loss due to bending and good connectivity with a common transmission optical fibre is described. The optical fibre comprises a core provided at a centre; a first cladding layer provided on a periphery of the core; a second cladding layer provided on a periphery of the first cladding layer; and a third cladding layer provided on a periphery of the second cladding layer, wherein a maximum refractive index of the core is greater than any of maximum refractive indices of the first cladding layer, the second cladding layer, and the third cladding layer, and the maximum refractive index of the second cladding layer is smaller than any of the maximum refractive indices of the first cladding layer and the third cladding layer, a value of a2/a1 is not less than 2.5 and not more than 4.5 when a radius of the core is a1 and a radius of an outer periphery of the first cladding layer is a2, and a relative refractive index difference of the core with respect to a refractive index of the third cladding layer is not less than 0.20 and not more than 0.70%.

EP 1788411 describes a single-mode optical fibre with a very small bending loss while conforming to the characteristics defined under ITU-T G. 652, such as chromatic dispersion, zero dispersion slope and cut-off wavelength. The fibre includes: a central core that has a radius $r_1$ and a refractive index $n_1$; an inner cladding that is provided around the outer circumference of the central core and has a radius $r_2$ and a refractive index $n_2$; a trench portion that is provided around the outer circumference of the inner cladding and has a radius $r_3$ and a refractive index $n_3$; and an outer cladding that is provided around the outer circumference of the trench portion and has a radius $r_4$ and a refractive index $n_4$, with a refractive index profile in which the refractive indexes of the individual portions satisfy $n_1 > n_4 \geq n_2 \geq n_3$. With reference to the refractive index $n_4$ of the outer cladding, a relative refractive index difference $\Delta 1$ of the central core, a relative refractive index difference $\Delta 2$ of the inner cladding, and a relative refractive index difference $\Delta 3$ of the trench portion satisfy the following relations: $0.40\% \leq \Delta 1 \leq 0.85\%$, $-0.20\% \leq \Delta 2 \leq 0.00$ and $-1.0\% < \Delta 3 < \Delta 2$.

SUMMARY OF THE INVENTION

Relatively high concentrations of fluorine are often needed in order to produce a depressed refractive index region with relative refractive index sufficiently negative, e.g. of less than $-2 \cdot 10^{-3}$, to provide a bend-resistant optical fibre. Most broadly, the deeper the depression of the inner cladding in the refractive index profile, the better the confinement of the optical power mode.

The Applicant has observed that if, on one hand, the fluorine-doped region should preferably be located relatively close to the core region in order to produce an effective optical power mode confinement, on the other hand, incorporation of fluorine by using soot deposition techniques followed by consolidation may produce migration of fluorine ions mainly into the overcladding region, thereby causing decrease or at least non-uniformity in the fluorine concentration in the region to be depressed.

The Applicant has recognised that an optical fibre with improved bending resistance—such to comply, for example, the G.657 standard—can be made by providing a refractive index profile wherein the inner cladding region surrounding the core region comprises a first inner cladding region and a second inner cladding region. The first inner cladding region borders the core region and is weakly doped with fluorine. The second inner cladding region has a non-negative refractive index and separates the first inner cladding region from an intermediate cladding region positioned radially outwardly the inner cladding region. The intermediate cladding region is more heavily fluorine-doped than the first inner cladding region.

Without wishing to be bound by any theory, the Applicant believes that the presence of a shallow depression in a refractive index region directly surrounding the light guiding core region improves light confinement of propagation modes in an optical fibre having a relatively deep depressed-index region and low macrobending losses can be achieved.

According to an aspect, the present invention relates to a single-mode transmission optical fibre comprising:
a central core region radially outwardly from a centerline to a radius $r_1$ and having a positive relative refractive index $\Delta_1$;
a first inner cladding region extending radially outwardly from the central core to a radius $r_2$ and having a negative relative refractive index $\Delta_2$;
a second inner cladding region extending radially outwardly from the first inner cladding region to a radius $r_3$ and having a non-negative relative refractive index $\Delta_3$;
an intermediate cladding region extending radially outwardly from the second inner cladding region to a radius $r_4$ having a negative relative refractive index $\Delta_4$ larger in absolute value than the relative refractive index $\Delta_2$, and
an outer cladding region extending radially outwardly from the intermediate cladding region and having a non-negative relative refractive index $\Delta_5$;
wherein the relative refractive index $\Delta_2$ of the first inner cladding region is of from $-0.1 \cdot 10^{-3}$ to $-1.0 \cdot 10^{-3}$ and the relative refractive index $\Delta_4$ of the intermediate cladding is of from $-3.0 \cdot 10^{-3}$ to $-5.0 \cdot 10^{-3}$.

Preferably, the radial width of the intermediate cladding region, defined as the difference $(r_4-r_3)$, is of from 8 µm to 22 µm.

Preferably, the first inner cladding region has a radial width defined as the difference $(r_2-r_1)$, is of from 2 µm to 4 µm.

Preferably the core region has a relative refractive $\Delta_1$ of from $4.5 \cdot 10^{-3}$ to $6.0 \cdot 10^{-3}$.

Advantageously, the relative refractive index $\Delta_3$ of the second inner cladding region is of from 0 to $1.0 \cdot 10^{-3}$.

Advantageously, the relative refractive index $\Delta_5$ of the overcladding region is on average zero.

In a preferred embodiment, the radius $r_1$ is of from 5.0 to 7.0 µm, the radius $r_2$ is of from 7.0 to 11.0 µm, the radius $r_3$ is of from 11.0 to 17.0 µm and the radius $r_4$ is of from 19.0 to 39.0 µm.

Preferably, the optical fibre of the invention is a silica-based optical fibre and the relative refractive indices $\Delta_1$, $\Delta_2$, $\Delta_3$, $\Delta_4$, and $\Delta_5$ are relative to undoped silica.

BRIEF DESCRIPTION OF THE DRAWINGS

The present invention will be now described more fully hereinafter with reference to the accompanying drawings, in which some, but not all embodiments of the invention are shown.

For the purpose of the present description and of the appended claims, except where otherwise indicated, all numbers expressing amounts, quantities, percentages, and so forth, are to be understood as being modified in all instances by the term "about". Also, all ranges include the maximum and minimum points disclosed and include any intermediate ranges therein, which may or may not be specifically enumerated herein.

DETAILED DESCRIPTION

Figure 1:
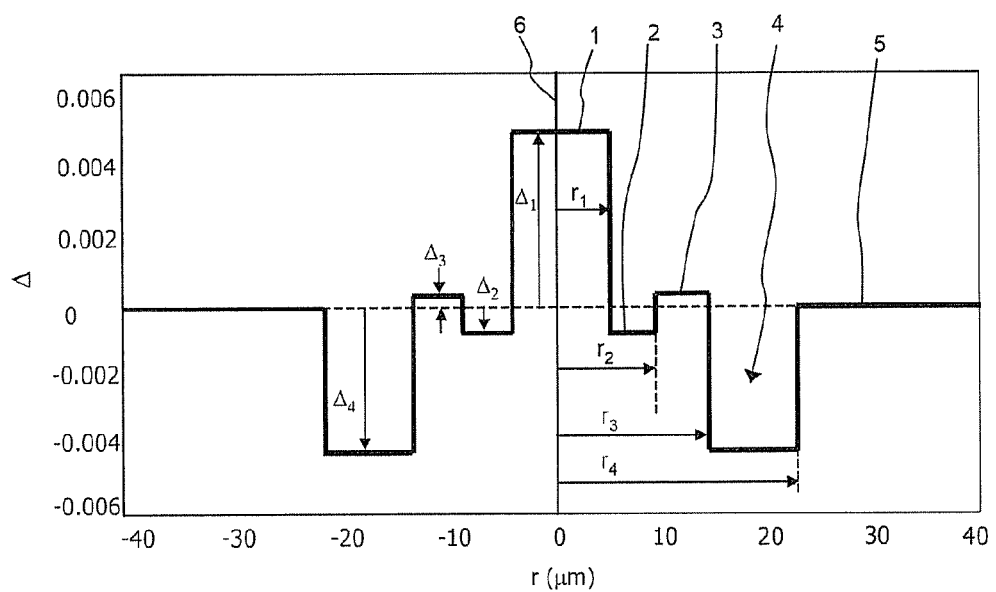
FIG. 1 is a diagram illustrating the relative refractive index profile of a cross section of an optical fibre according to an embodiment of the present invention.

FIG. 1 is a diagram illustrating the relative refractive index profile of a cross section of a single-mode optical fibre according to an embodiment of the present invention, as a function of the radial distance r from the centreline of the fibre (r=0). The optical fibre comprises a central core region 1, an inner cladding surrounding the core region and formed by a first inner cladding 2 bordering the core region 1 and a second inner cladding 3 surrounding the first inner cladding 2. An intermediate cladding region 4 surrounds the second inner cladding region 3 and an overcladding region 5 extends radially from the intermediate cladding to the outer diameter of the fibre. The optical fibre can have a typical outer diameter of about 125 µm.

The central core region 1 extends radially outwardly from a centerline 6 to a radius $r_1$. The central core region has a positive relative refractive index $\Delta_1$ and is preferably made of silica doped with a doping element that increases the refractive index, such as germanium.

The relative index profile takes as a reference the average refractive index of the overcladding region 5. In the preferred embodiments, the overcladding region 5 is made of substantially pure (undoped) silica. In cases where the refractive index of a region is lower than the average refractive index of the overcladding region 5, the relative index percent is negative and is referred to as having a depressed index or an index depression. The depressed index or index depression is calculated at the point at which the relative index is most negative unless otherwise specified. In cases where the refractive index of a region is greater than the average refractive index of the overcladding region 5, the relative index percent is positive and is calculated at the point at which the relative index is maximum, unless otherwise specified.

The relative refractive index, $\Delta_i$, of a region i of the refractive index profile is given by $$\Delta_i = n_i - n_o \qquad (1)$$

where $n_i$ is the refractive index of the region i and $n_o$ is the average refractive index of the overcladding region, i.e. the refractive index of pure silica in the preferred embodiments.

The first inner cladding region 2 extends radially outwardly from the central core region to a radius $r_2$ and has a radial width $(r_2-r_1)$. The second inner cladding region 3 extends radially outwardly from the first inner cladding region 2 to a radius $r_3$ and has a radial width ($r_3$-$r_2$). In the preferred embodiments, the radial width ($r_3$-$r_1$) defines the radial distance of the intermediate cladding region from the core region 1. In those embodiments, the first inner cladding region 2 is directly adjacent to the core region 1 and the second inner cladding region 3 is directly adjacent to the first inner cladding region 2.

The first inner cladding region 2 has a negative relative refractive index $\Delta_2$ and the second inner cladding region 3 has a non-negative relative refractive index $\Delta_3$.

Preferably, the relative refractive index $\Delta_3$ of the second inner cladding region 3 is of from 0 to $0.5 \cdot 10^{-3}$, more preferably is on average zero because the second inner cladding region 3 is made of pure silica.

The intermediate cladding region 4 extends radially outwardly from the second inner cladding region 3 to a radius $r_4$ for a width of ($r_4$-$r_3$). The intermediate cladding region 4 has a negative relative refractive index $\Delta_4$ larger in absolute value than the relative refractive index $\Delta_2$ of the first inner cladding region 2. Preferably, the first inner cladding region 2 is doped with fluorine to produce a shallow depressed index region. The intermediate cladding region 4 is preferably silica doped with fluorine to decrease the refractive index and create a relatively deep depressed-index region. Preferably, the relative refractive index $\Delta_4$ of the intermediate cladding region 4 is of from $-3.0 \cdot 10^{-3}$ to $-5.0 \cdot 10^{-3}$. Preferably, the relative refractive index $\Delta_2$ of the first inner cladding region is of from $-0.1 \cdot 10^{-3}$ to $-1.0 \cdot 10^{-3}$.

The overcladding region 5 extends radially outwardly from the intermediate cladding region 4 and has a non-negative relative refractive index $\Delta_5$. Preferably, the relative refractive index $\Delta_5$ is on average zero, and the overcladding region 5 is made of pure silica.

In the preferred embodiments, the relative refractive index $\Delta_1$ of the core region 1 is of from $4.0 \cdot 10^{-3}$ to $5.5 \cdot 10^{-3}$ and the radius $r_1$ is of from 3.0 to 7.0 μm.

Preferably, the first inner cladding region has radius $r_2$ of from 5.0 to 11.0 μm and radial width ($r_2$-$r_1$) of from 2 μm to 4 μm. Preferably, the radius $r_4$ of the intermediate cladding region 4 is of from 12.0 to 25.0 μm and its radial width ($r_4$-$r_3$) is of from 8 μm to 22 μm. Preferably, the radial distance of the intermediate cladding region from the core region, ($r_3$-$r_1$), is of from 6 to 10 μm.

Figure 2A:
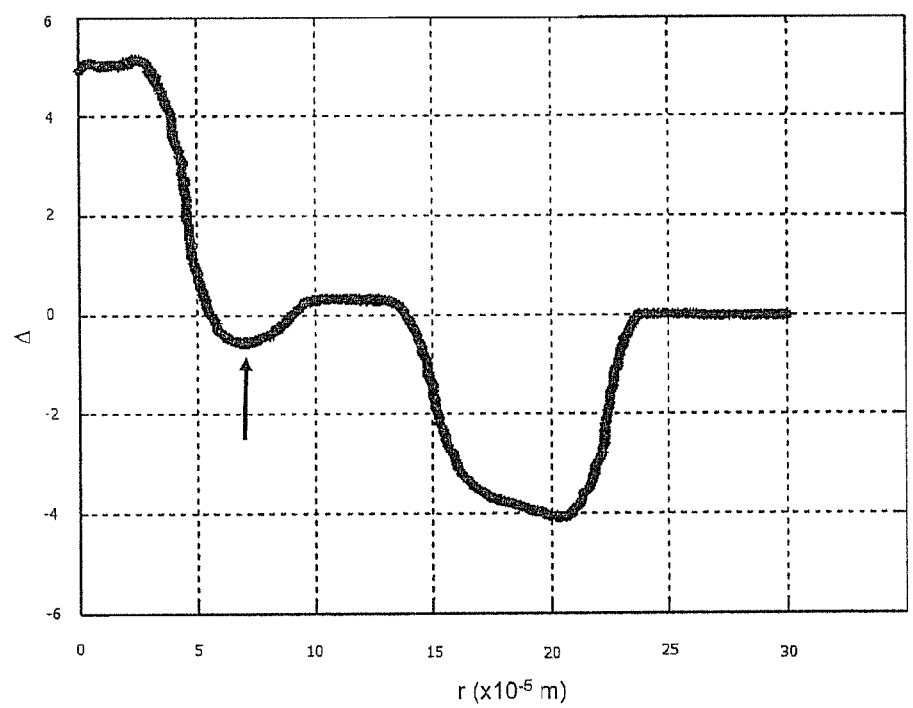
FIG. 2a and FIG. 2b show, respectively, the relative refractive index profile of an optical fibre according to an embodiment of the present invention and of an optical fibre having the same refractive index profile but for the absence of a shallow index depression in the first inner cladding region.
Figure 2B:
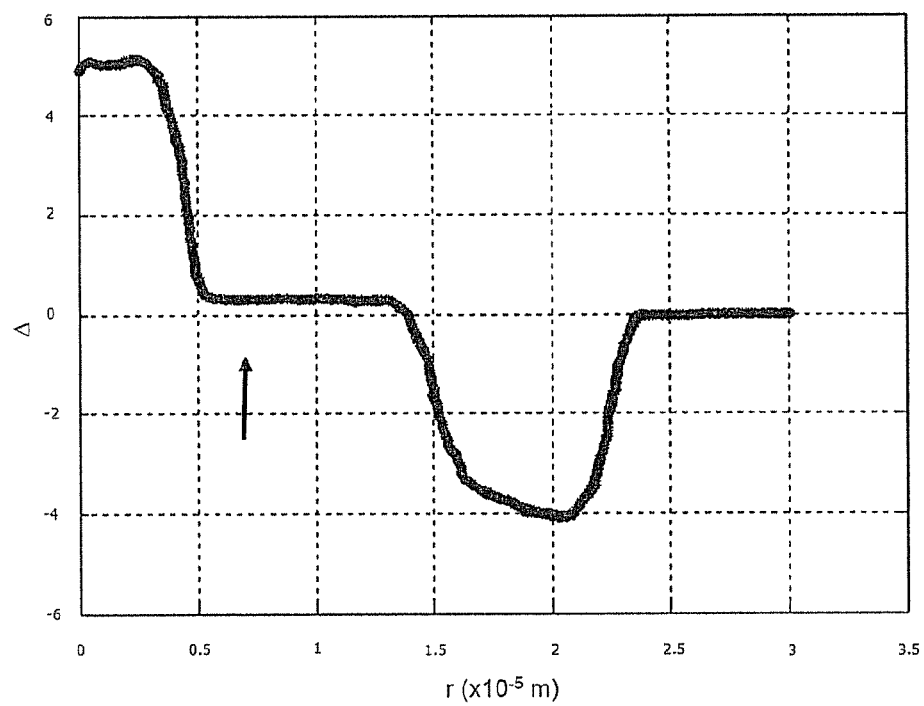

FIGS. 2a and 2b are graphs showing the relative refractive index profile of, respectively, a first optical fibre according to an embodiment of the present invention and of a second optical fibre that has the same refractive index profile of the first fibre but for the absence of the shallow index depression in the first inner cladding region. Half cross-section of the profiles is represented in the figures and the radial distance is shown in $10^{-5}$ m. The first inner cladding region of the first and second fibres is indicated in the figures with an arrow. In the illustrated profiles: $\Delta_1$=5.2·10$^{-3}$, $r_1$=6 μm; $r_2$=9 μm; $\Delta_3$=0.2·10$^{-3}$, $r_3$=13 μm; $\Delta_4$=-4.1·10$^{-3}$, $r_4$=23 μm, and $\Delta_5$=0. In the profile of FIG. 2a, $\Delta_2$=-0.5·10$^{-3}$, whereas in the profile of FIG. 2b, $\Delta_2$=0.2·10$^{-3}$.

Figure 3:
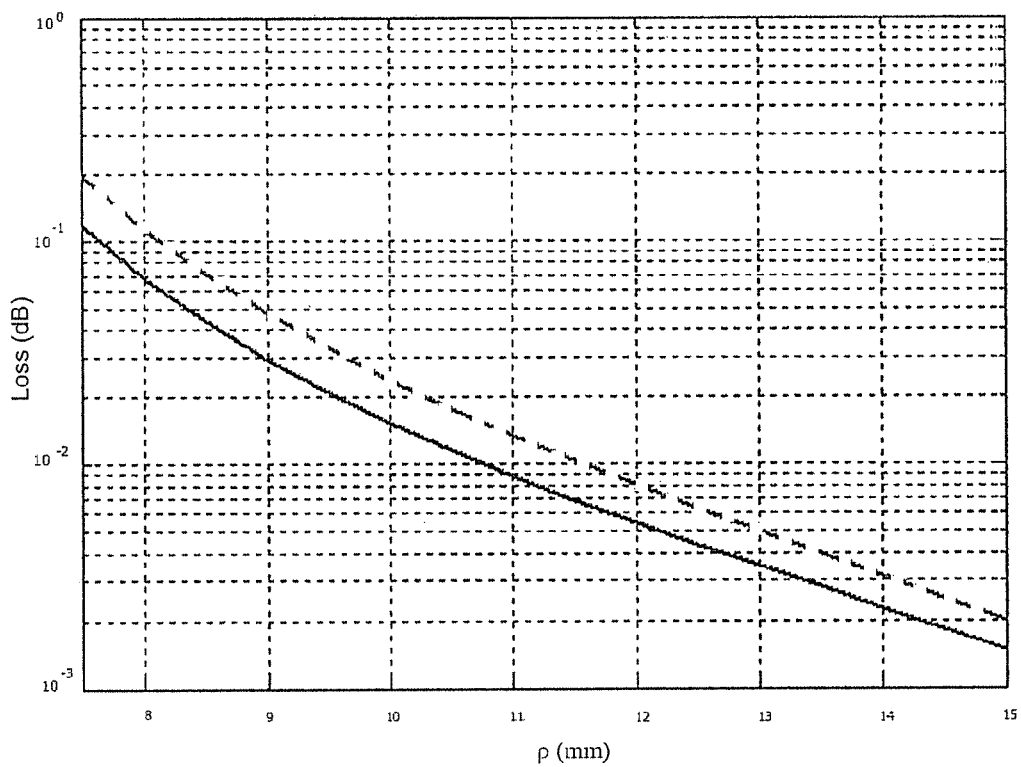
FIG. 3 is a graph showing macrobending loss at 1550 nm obtained by computational simulations as a function of the bending radius for 1 turn around a mandrel of an optical fibre with the refractive index of FIG. 2a (solid line) and of an optical fibre with refractive index of FIG. 2b (dashed line).

FIG. 3 is a graph showing results obtained using computational simulations of the macrobending loss at 1550 nm (dB) of an optical fibre having the refractive index profile of FIG. 2a (solid line) and of an optical fibre with the refractive index profile of FIG. 2b (dashed line). In abscissa, the bending radius ρ (mm) and in ordinate the macrobending loss (dB). Optical loss has been calculated for 1 turn around a mandrel of bending radius ranging from 7.5 to 15 μm. Results in FIG. 3 show that macrobending loss is significantly lower in case of the presence of a shallow refractive index depression in the first inner cladding (solid line). For 7.5 μm bending radius, the macrobending loss of the fibre with the profile of FIG. 2a is of 0.1 dB, whereas the macrobending loss of the fibre with the profile of FIG. 2b is of 0.20 dB.

When calculated at 1625 nm with the same bending radius, the macrobending loss of the fibre with the profile of FIG. 2a is of 0.29 dB, whereas the macrobending loss of the fibre with the profile of FIG. 2b is of 0.49 dB.

Table 1 summarises the optical properties calculated by computational simulations of the optical fibres with refractive index profile reported, respectively, in FIGS. 2a and 2b.

TABLE 1

| Optical parameter | Profile FIG. 2a | Profile FIG. 2b |
|---|---|---|
| MFD at 1310 nm | 9.2 μm | 9.5 μm |
| MFD at 1550 nm | 10.3 μm | 10.7 μm |
| Zero dispersion wavelength | 1309 nm | 1316 nm |
| Slope at zero dispersion wavelength | 0.0885 ps/nm$^2$·km | 0.0878 ps/nm$^2$·km |
| Chromatic dispersion coefficient at 1550 nm | 17.3 ps/nm·km | 17.0 ps/nm·km |
| Chromatic dispersion coefficient at 1625 nm | 21.6 ps/nm·km | 21.4 ps/nm·km |

The core region and the inner cladding region are preferably made by a chemical vapour deposition technique, for example by Modified Chemical Vapour Deposition (MCVD), so as to form an inner glass rod. Alternatively, soot deposition techniques like Outside Vapour Deposition (OVD) or also Vapour Axial Deposition (VAD) may be envisaged.

In a preferred embodiment, the glass inner preform is then inserted into a fluorine-doped intermediate cladding glass tube to form a rod-in-tube assembly. The rod-in-tube assembly is heated in a furnace or by means of a burner at the softening glass temperature to collapse the intermediate cladding glass tube onto the inner glass rod to produce an inner glass preform.

An overcladding can be formed around the inner glass preform by a soot deposition technique, such as Vapour Axial Deposition (VAD) or Outside Vapour Deposition (OVD). In other embodiments, the inner glass preform can be inserted into an outer silica glass tube which is then soften to collapse around the inner glass preform (sleeving technique).

EXAMPLE

A hollow cylindrical substrate tube made of pure silica and having a radial thickness of 3 mm was mounted onto a MCVD horizontal lathe. A gaseous mixture comprising soot-forming reagent chemicals was flown into the cylindrical cavity of the substrate tube Concurrently to gaseous mixture injection into the substrate tube, the substrate tube was continuously rotated and its outside surface was heated by traversing a flame along the outside surface in a plurality of passes along opposite axial directions at a temperature of about 1950° C. First, a first inner cladding was produced by flowing a gaseous mixture comprising $SiCl_4$, $Cl_2$, $O_2$, He and $SF_6$ and, subsequently, the core was produced by flowing a gasous mixture comprising $SiCl_4$, $GeCl_4$, He and $O_2$.

The resulting core rod comprises a germanium-doped core region and an inner cladding region surrounding the core region and comprising a first inner cladding region with shallow doping of fluorine and a second inner cladding region of undoped silica ($SiO_2$). The second inner cladding region corresponds to the cylindrical substrate tube used for the MCVD process.

The solid core rod of germanium-doped silica was removed from the MCVD lathe to be inserted into an intermediate-cladding glass tube made of silica doped with fluorine at a concentration approximately constant which provides a relative refractive index to pure silica of $-3.4 \cdot 10^{-3}$ equivalent to a fluorine concentration of 7%. The tube length was of 1000 mm. The inner diameter of the tube was of 20 mm and the outer diameter of 29 mm and thus the tube had a radial thickness of 4.5 mm.

Collapse of the intermediate cladding tube onto the rod was made by mounting the core assembly in a sleeving apparatus with an upper end of the core assembly connected to a vacuum pump. An annular oxygen/hydrogen burner was positioned at a lower length section of the intermediate cladding tube near the lower end of the core assembly. The burner was turned on to generate an annular flame of oxygen flow rate of 25 slpm and hydrogen flow rate of 60 slpm. At the beginning of the process, the flame traversed the lower length section of the intermediate cladding tube so as to seal the tube onto the core rod in correspondence to this length section. Once the lower end of the tube was closed onto the core rod, the vacuum pump created a negative pressure through the annular gap of the assembly of about 0.6 bar. Then the burner travelled upwardly along the glass tube at a speed of 35 mm/min to soften and collapse the tube around the rod. After a single pass of the burner, the intermediate cladding tube thermally collapsed onto the rod to create a core preform of about 27 mm of diameter. During operation of the burner, the core assembly was rotated of 5 rpm.

The core preform was then mounted on an OVD lathe and silica soot was deposited on the rotated mandrels by a standard OVD process. The soot deposition was continued until the sought weight for the formation of an overcladding region was obtained. The soot porous preform was then sintered in a furnace kept at 1550° C. while introducing He gas and $Cl_2$ gas in a ratio of 95:5. The consolidated optical fibre preform had an outer diameter of 80 mm.

The preform was moved to a drawing tower and drawn at a temperature of 2000-2100° C. to fabricate a single-mode optical fibre of outer diameter of about 125 μm.

Figure 4:
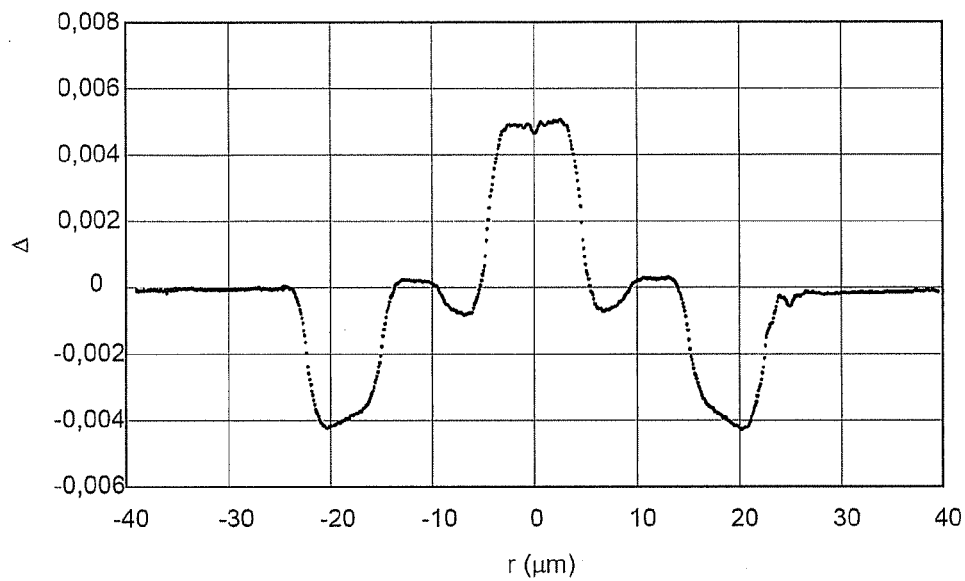
FIG. 4 shows an exemplary refractive index profile of a single-mode optical fibre according to the invention.

FIG. 4 shows the measured relative refractive index profile of the optical fibre fabricated according to the method of the example. The optical fibre comprises a germanium-doped central core region of relative refractive index $\Delta_1 = 5.5 \cdot 10^{-3}$ with respect to the overcladding region that is made of undoped silica ($\Delta_5 = 0$) and $r_1 = 5.75$ μm. A first inner cladding region slightly doped with fluorine has a relative refractive index of about $\Delta_2 = -0.5 \cdot 10^{-3}$ and $r_2 = 9$ μm. A second inner cladding region has relative refractive index $\Delta_3 = 0.35 \cdot 10^{-3}$ and $r_3 = 14$ μm. A fluorine-doped intermediate cladding region of width of 9.7 μm and negative relative refractive index of about $-4.1 \cdot 10^{-3}$ surrounds the second inner cladding region.

Figure 5:
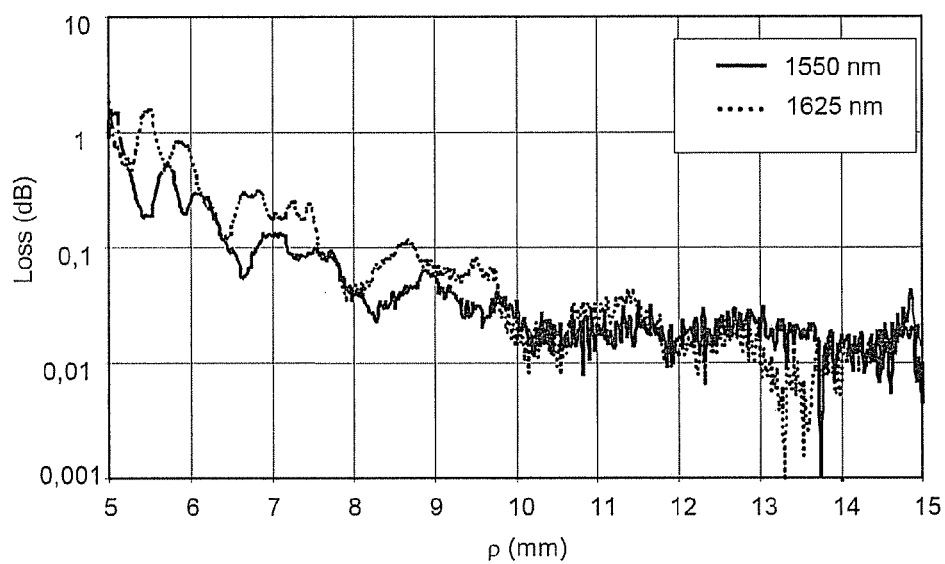
FIG. 5 is a graph showing measurements of macrobending loss (dB) as a function of the bending radius for 1 turn of the fibre around a mandrel for the optical fibre of FIG. 4.

The optical fibre of the present example had the following optical properties:

Zero dispersion wavelength of 1306.5 nm
  Chromatic dispersion coefficient at 1550 nm of 17.004 ps/nm·km and
  Chromatic dispersion coefficient at 1625 nm of 21.227 ps/nm·km
Slope at zero dispersion wavelength of 0.0854 ps/nm²·km
Optical attenuation at the 1380 nm of 0.9 dB/km
Mode field diameter (MFD) at 1310 nm of 9.2 μm
Mode field diameter (MFD) at 1550 nm of 10.3 μm FIG. 5 is a graph showing measurements of macrobending loss (dB) as a function of the bending radius, ρ (mm), for 1 turn of the fibre of the present example around a mandrel for transmission of light at 1550 nm (solid line) and at 1625 nm (dotted line) for the optical fibre of FIG. 4. Experimental results show that macrobending loss at 1550 nm for 1 turn of 7.5 μm bending radius is of 0.1 dB and at 1625 nm, always for a 7.5 μm bending radius, is of 0.1 dB.

The optical parameters of the optical fibre conform to the specifications of G.657 standards.

The invention claimed is:

1. A single-mode transmission optical fibre comprising:
   a central core region radially outwardly from a centerline to a radius $r_1$ and having a positive relative refractive index $\Delta_1$;
   a first inner cladding region extending radially outwardly from the central core to a radius $r_2$ and having a negative relative refractive index $\Delta_2$;
   a second inner cladding region extending radially outwardly from the first inner cladding region to a radius $r_3$ and having a non-negative relative refractive index $\Delta_3$;
   an intermediate cladding region extending radially outwardly from the second inner cladding region to a radius $r_4$ having a negative relative refractive index $\Delta_4$ larger in absolute value than the relative refractive index $\Delta_2$; and
   an outer cladding region extending radially outwardly from the intermediate cladding region and having a non-negative relative refractive index $\Delta_5$,
   wherein the relative refractive index $\Delta_2$ of the first inner cladding region is $-0.1 \cdot 10^{-3}$ to $-1.0 \cdot 10^{-3}$, the relative refractive index $\Delta_3$ of the second inner cladding region is 0 to $0.5 \cdot 10^{-3}$, and the relative refractive index $\Delta_4$ of the intermediate cladding is $-3.0 \cdot 10^{-3}$ to $-5.0 \cdot 10^{-3}$, and
   wherein the radial width of the intermediate cladding region, defined as a difference ($r_4 - r_3$), is from 8 μm to 22 μm.

2. The single-mode transmission optical fibre according to claim 1, wherein the first inner cladding region has a radial width, defined as a difference ($r_2 - r_1$), is 2 μm to 4 μm.

3. The single-mode transmission optical fibre according to claim 1, wherein the core region has a relative refractive $\Delta_1$ of $4.5 \cdot 10^{-3}$ to $6.0 \cdot 10^{-3}$.

4. The single-mode transmission optical fibre according to claim 1, wherein the relative refractive index $\Delta_5$ of the outer cladding region is on average zero.

5. The single-mode transmission optical fibre according to claim 1, wherein radius $r_1$ is 5.0 to 7.0 μm.

6. The single-mode transmission optical fibre according to claim 1, wherein radius $r_2$ is 7.0 to 11.0 μm.

7. The single-mode transmission optical fibre according to claim 1, wherein radius $r_3$ is 11.0 to 17.0 μm.

8. The single-mode transmission optical fibre according to claim 1, wherein radius $r_4$ is 19.0 to 39.0 μm.

9. The single-mode transmission optical fibre according to claim 1, wherein the relative refractive index $\Delta_3$ of the second inner cladding region is on average zero, corresponding to that of undoped silica.

* * * * *